3,015,617
METHOD AND APPARATUS FOR AQUEOUS
HOMOGENEOUS REACTOR SYSTEMS
Jay E. Brunings, Bloomfield, N.J., assignor to Foster
Wheeler Corporation, New York, N.Y., a corporation
of New York
Filed Mar. 21, 1958, Ser. No. 722,991
1 Claim. (Cl. 204—193.2)

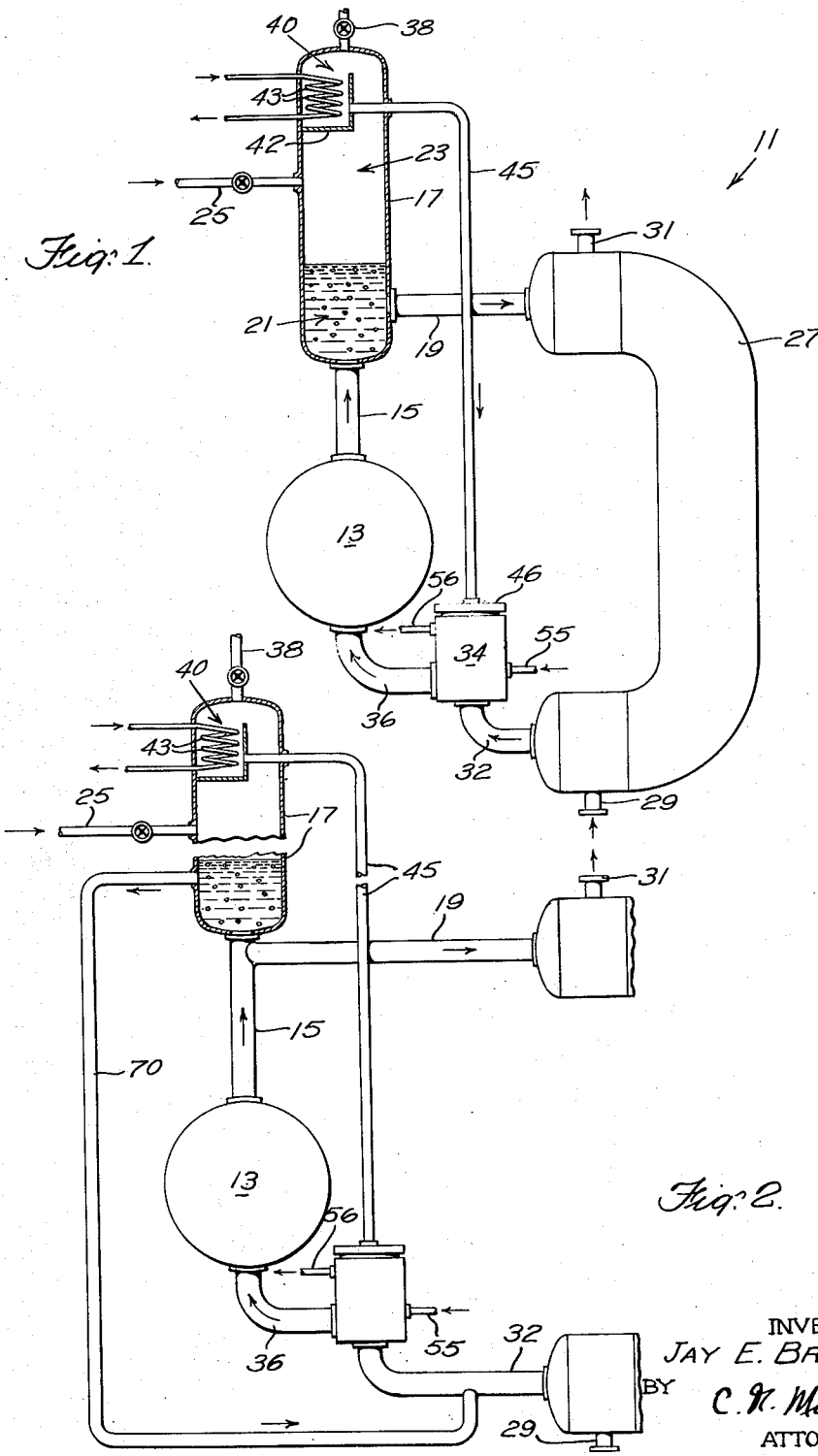

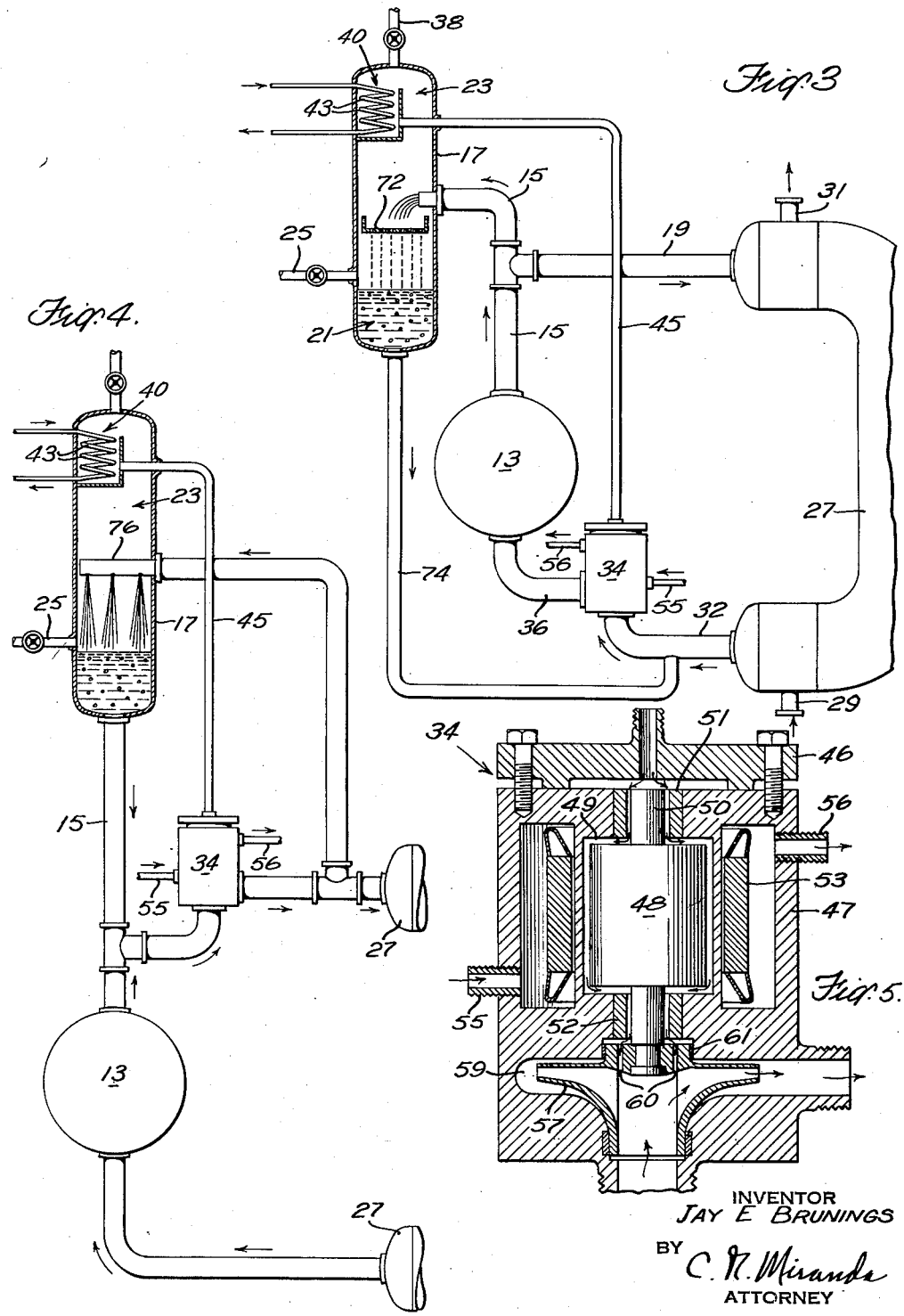

This invention relates to neutronic reactors and more particularly to aqueous homogeneous reactor systems pressurized by gas and employing a solution of fissionable material as a fuel.

In the operation of an aqueous homogeneous reactor system a number of problems exist which if not solved tend to disrupt or at least produce troublesome operation of the reactor system. One problem is the production of gaseous fission products, as for example xenon, krypton and iodine which build up and eventually poison the reaction if not removed. Another difficulty in the operation of the reactor is the dissociation of water to form hydrogen and oxygen which could explode causing shock in the system. In an effort to overcome this last problem, some reactor systems employ a catalyst to effect the recombination of hydrogen and oxygen to form water.

In reactor systems with which the present invention is concerned, the fuel solution is maintained under pressurization by a gas, as for example, steam. It has been found that the use of steam, however, is undesirable because the steam condenses to water and the temperature of the fuel solution thereby can be raised to a value causing precipitation of uranium and consequent corrosion problems.

Aqueous homogeneous reactor systems utilize a pump, generally known as a "canned" motor pump, which circulates the fuel solution in the system. The pump is sealed to the atmosphere and includes a rotor which is immersed in fuel solution; the solution serving to lubricate the rotor bearings therein. A problem arising with the operation of the pump is the failure of the bearings because of gas binding and the precipitation of uranium which collects adjacent to the bearings. The precipitate is in the form of small hard granules somewhat like sand, and the presence of the precipitate in the bearings causes abrasion of the latter which eventually inactivates the pump.

The present invention has for an object the provision of novel methods of operation of aqueous homogeneous neutronic reactor systems and apparatus therefor.

The invention contemplates a novel method of removing fission product gases from an aqueous homogeneous neutronic reactor system which includes a reactor, a pressurizer vessel, a heat exchanger and a pump for circulating the fuel solution. At least a portion of the fuel solution is passed into the pressurizer vessel which has a gas space deficient in fission product gases, whereby the fission product gases in the fuel solution entering the pressurizer are stripped therefrom. A gas is used for pressurizing the system and is introduced into the gas space of the pressurizer for that purpose. In the present invention oxygen is used as the pressurizing gas and in addition to such function also serves to inhibit corrosion in the system. As matter of preventing failure of the pump, novel purging and venting means are provided in combination with the components of the reactor system. The novel purging and venting means effects the constant flow of purging liquid over the pump bearings to prevent collection of precipitate on the latter and enables non-condensible gases to escape from the pump.

The invention will be understood from a consideration of the detailed description which follows taken together with the accompanying drawings wherein several embodiments of the invention are illustrated.

In the drawings, wherein like references refer to like parts throughout the several views, FIG. 1 is a diagrammatic representation of an aqueous homogeneous reactor system embodying the present invention;

FIGS. 2, 3 and 4 are diagrammatic representations of reactor systems similar to that shown in FIG. 1 but differing therefrom primarily in that only a portion of the fuel solution passes into the pressurizer; and FIG. 5 is an enlarged diagrammatic illustration of a pump used in the systems of FIGS. 1 to 4.

Referring now to the drawings for a more detailed description of the present invention and more particularly to FIG. 1 wherein one embodiment is clearly illustrated, an aqueous homogeneous neutronic reactor system, generally designated by the numeral 11, comprises a neutronic reactor 13 wherein neutronic fission chain reaction occurs. The fissionable material employed in the present invention is an aqueous solution or slurry containing uranium which leaves the reactor 13 through a conduit 15. The fuel solution flowing through conduit 15 enters a pressurizer vessel 17 through the bottom thereof and leaves the vessel by way of a conduit 19. Vessel 17 has a lower liquid space 21, wherein the fuel solution collects, and an upper gas space 23. An inlet gas conduit 25 is connected to gas space 23 to supply the latter with a gas, as for example oxygen which is deficient in fission product gases, and such gas is used to provide for pressurization of the system. Conduit 19 is connected to a heat exchanger 27 and conducts the fuel solution from the pressurizer vessel 17 to the heat exchanger where the solution passes in indirect heat exchange relationship with a coolant which enters the exchanger by way of an inlet conduit 29; the coolant is discharged from the exchanger through an outlet conduit 31. The cooled solution thence flows from exchanger 27 through a conduit 32, whence the fuel solution is returned to reactor 13 by a "canned" motor pump 34 via a conduit 36.

In the operation of an aqueous homogeneous neutronic reactor system of the kind described hereinabove, undesirable fission product gases such as xenon, krypton and iodine are formed which, if not removed, build up to a point where they tend to poison the fission reaction. The present invention contemplates a novel method whereby the gases are removed from the system and includes the step of maintaining gases in gas space 23 of pressurizer vessel 17 deficient in fission product gases. As a result, the gas phase in vessel 17 strips the fission gas products from the fuel solution in liquid space 21 because the circulation of the fuel solution through the pressurizer vessel continuously introduces a solution rich in fission product gases to an atmosphere which is deficient in same. The mixture of gases in vessel 17 is maintained deficient in fission product gases by venting the gases through venting means 38 to a suitable off-gas system (not shown) and such venting operation can be performed continuously or in batch operations. As an aid in maintaining the stripping atmosphere in gas space 23 of pressurizer vessel 17 deficient in fission product gases, the pressurization gas utilized is oxygen which as pointed out hereinbefore, functions to pressurize the system. The use of oxygen as a pressurizing gas also serves to inhibit corrosion in the components forming the reactor system.

It is desirable to purge the region between the rotor and the stator and the bearings of "canned" motor pump 34 with clean water to minimize, among other things, the possibility of solids accumulation as a result of precipitation of uranium in the fuel solution. Also, it is desirable to vent the pump during filling and during reactor operation to remove any noncondensible gases which collect in these regions. To this end, the present invention provides novel purging and venting means which includes a condenser 40 arranged in the gas space 23 of pressurizer vessel 17. Condenser 40 comprises an open top container 42 which is mounted on the wall of vessel 17 and accommodates therein a cooling coil 43 supplied with a cooling fluid from a source not shown. A conduit 45 has one end secured to container 42 and the other end connected to a top plate 46 (FIG. 5) of pump 34 having a housing 47. Pump 34 is diagrammatically illustrated in FIG. 5 as including a vertically disposed rotor 48 in a chamber 49 and the rotor has a shaft 50 which is mounted for rotation in upper bearing 51 and lower bearing 52. A stator 53 is arranged in a chamber 54 of housing 47 and the chamber is provided with a coolant liquid which enters through inlet 55 and discharges through an outlet 56. An impeller 57 is secured to the lower end of shaft 50 below bearing 52 and is disposed in a chamber 59. Impeller 57 is provided with a plurality of openings 60 arranged in a circular manner and concentric with a sealing ring 61 adjacent the impeller.

In the operation of the purging and venting means water vapor in gas space 23 of pressurizer vessel 17 is condensed in container 42 of condenser 40 and the condensate is circulated to the top of pump 34 by way of conduit 45. The purge water then flows through the space between bearing 51 and the upper end of shaft 50, whence it passes through chamber 49, discharging through the space between the lower end of shaft 50 and bearing 52 (the spaces between bearings 51 and 52 and the ends of shaft 50 being exaggerated in FIG. 5 for purposes of clarity). The water then flows through openings 60 into the interior of impeller 57 where it mixes with the main circulating fuel solution leaving chamber 59. Purge water circulation through pump 34 is provided by so designing the pump that the hydrostatic pressure in the interior of impeller 57 is below the pressurizer pressure to overcome frictional losses in the purge conduit 45. Sealing ring 61 serves to prevent passage of the higher pressure fuel solution into the space above the impeller and, consequently, the possibility of flow of fuel solution upwardly in the pump is obviated along with any accumulation of solids in the solution. In this manner, a constant pressure differential for uniform purge water flow is provided regardless of the absolute pressure in the vessel 17. Of course, it is readily apparent from the foregoing construction that conduit 45 serves as a vent line to vent noncondensible gases from the pump to the pressurizer vessel 17.

A second embodiment of the present invention is disclosed in FIG. 2 and differs from the first embodiment in that only a portion of the fuel solution is introduced into the pressurizer vessel 17. The embodiment of the invention illustrated in FIG. 2 is in many respects similar to the first embodiment and where appropriate the same reference characters have been employed to designate corresponding parts. As shown in FIG. 2, the fuel solution leaves reactor 13 through conduit 15, whence a portion of the solution passes into the pressurizer vessel 17 and the remainder of the solution flows through conduit 19 to heat exchanger 27 (partly shown). Fuel solution is discharged from vessel 17 through a conduit 70 having one end connected to the vessel and the other end connected to conduit 32, where the fuel solution mixes with the cooled fuel solution leaving the heat exchanger 27. The operation of the reactor system of FIG. 2 is the same as that of FIG. 1 except that only a portion of the fuel solution flows through pressurizer vessel 17. It is found that the reactor system of FIG. 2 is preferable when the power output requirements of a reactor system are less than the power output requirements of a system such as shown in FIG. 1. Since the power output requirements are less, the rate of production of fission product gases is less. Consequently, only a portion of the fuel solution must be passed through the pressurizer vessel where such gases are stripped from the fuel solution.

A third embodiment of the present invention is disclosed in FIG. 3, and is similar to the embodiment of FIG. 2, in that only a portion of the fuel solution is passed through the pressurizer vessel 17. The third embodiment, however, differs from the second embodiment in that the fuel solution from reactor 13 is not passed into the bottom of vessel 17 but rather the fuel solution enters gas space 23 of the vessel where the liquid flows onto a perforated plate 72 in gas space 23. The fuel solution on plate 72 passes through perforations therein where it is broken into droplets and as a result, greater surface contact is presented between the fuel solution and the stripping atmosphere in space 23. A conduit 74 has one end connected to the bottom of vessel 17 to conduct fuel solution therefrom and has the other end connected to conduit 32 where it flows in admixture with the cooled fuel solution leaving heat exchanger 27.

A fourth embodiment is illustrated in FIG. 4 and is similar in many respects to that shown in FIG. 3 except that a sprayer nozzle 76 is disposed in gas space 23 to provide a finer spray of fuel solution to the stripping atmosphere and thereby effect a greater stripping action. Furthermore, pump 34 in this embodiment is positioned in between the outlet of the reactor and the inlet of the heat exchanger. This is found to reduce thermal shocks on pump 34, as compared to the position of the pump in the first three embodiments where it is located between the outlet of the heat exchanger and the inlet of the reactor.

The reactor system arrangements heretofore described utilize a one region reactor for illustrative purposes only. It should be understood, however, that the principles of the present invention are also applicable to two region aqueous homogeneous reactors.

From the foregoing, it is apparent that the present invention provides novel methods of operating an aqueous homogeneous neutronic reactor system to effectively remove fission product gases from the fuel solution. By passing the fuel solution into a pressurizer having a stripping atmosphere deficient in fission product gases, poisoning of the fission chain reaction by such gases is obviated. Furthermore, the use of oxygen as a pressurizing gas inhibits corrosion in the components of the reactor system and aids in maintaining the stripping atmosphere in the pressurizer vessel. Also, it is apparent that efficient operation of the "canned" motor pump is effected through the novel purging and venting means of the present invention.

Although several embodiments of the invention have been illustrated and described in detail, it is to be expressly understood that the invention is not limited thereto. Various changes can be made in the steps of the methods and the design and arrangement of the parts without departing from the spirit and scope of the invention as the same will now be understood by those skilled in the art.

What is claimed is:

In a homogeneous neutronic reactor system comprising a reactor, a heat exchanger, a pump for circulating an aqueous nuclear fuel solution through the system, and a pressurizer, said pressurizer comprising a vessel, the lower portion of which is connected to the system and contains a quantity of said fuel solution, the upper portion of said vessel being connected to a source of pressurized gas and gas exhaust means connected to the upper portion of said vessel to provide a flow of said pressurized gas through the upper portion of said vessel to facilitate the stripping of gaseous fission products from said fuel solution, the improvement consisting of venting and purging means comprising a cooling condenser arranged in the upper portion of said pressurizer vessel for condensing water vapor therein, said condenser including a container for retaining condensate therein, a conduit connected at one end to said container and at the other to the pump for delivering condensate to the bearings thereof and for venting noncondensible gases from the pump to the pressurizer vessel.

References Cited in the file of this patent

UNITED STATES PATENTS

| | | |
|---|---|---|
| 2,743,225 | Ohlinger et al. | Apr. 29, 1956 |
| 2,811,487 | Stanton | Oct. 29, 1957 |

OTHER REFERENCES

Proceedings of the International Conference on the Peaceful Uses of Atomic Energy, vol. III, pp. 263–266 and 273–274, United Nations, New York, 1956.

Proceedings of the International Conference on the Peaceful Uses of Atomic Energy, vol. III, p. 244, United Nations, New York, 1956, article by Dahl.

Progress in Nuclear Engineering, vol. IV, Technology and Engineering (Hurst et al., editors), McGraw-Hill Book Co., New York, 1956, pp. 178, 179.

PNG–7, AEC Publication, p. 11, February 1956.